(12) United States Patent
Maruyama et al.

(10) Patent No.: US 6,665,102 B2
(45) Date of Patent: Dec. 16, 2003

(54) GALVANOMETER-TYPE SCANNER

(75) Inventors: Toshiki Maruyama, Nagano-ken (JP);
Nozomu Tanioka, Nagano-ken (JP);
Kunio Miyashita, Nagano-ken (JP);
Akira Akahane, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 10/253,716

(22) Filed: Sep. 25, 2002

(65) Prior Publication Data

US 2003/0063357 A1 Apr. 3, 2003

(30) Foreign Application Priority Data

Sep. 28, 2001 (JP) ......................................... 2001-303001

(51) Int. Cl.[7] ................................................ G02B 26/08
(52) U.S. Cl. ...................... 359/199; 359/198; 359/200; 359/213; 359/214; 310/177
(58) Field of Search ................................... 359/198, 199, 359/200, 213, 214; 346/107.3–107.5; 310/36, 66, 145, 177; 318/37, 119

(56) References Cited

U.S. PATENT DOCUMENTS

| 4,024,545 | A | * | 5/1977 | Dowling et al. |
| 5,869,945 | A | * | 2/1999 | Ha et al. |
| 5,973,320 | A | * | 10/1999 | Maruyama et al. |
| 6,366,048 | B2 | * | 4/2002 | Greif |

* cited by examiner

Primary Examiner—James Phan
(74) Attorney, Agent, or Firm—Burns, Doane, Swecker & Mathis, L.L.P.

(57) ABSTRACT

A DC motor of a galvanometer-type scanner has four poles, and compared to a conventional DC motor with a bipolar construction, the armature inductance L can be reduced to half or less for a case where the external diameter of the rotor and the induced voltage constant $K_E$ are the same. Since $K_E/L$, which is the index for the rise of torque of the motor, is increased by a factor of two or more, the responsiveness of the motor can be improved without increasing the exciting current of the winding. Accordingly, it is possible to provide a galvanometer-type scanner that can set minute angles of around one degree within several hundred microseconds.

1 Claim, 4 Drawing Sheets

COMPARISON OF BIPOLAR AND FOUR-POLAR CONSTRUCTIONS

CONTROL CIRCUIT FOR A GALVANOMETER-TYPE SCANNER

WAVEFORM OF MOTOR
EXCITING CURRENT AT STARTUP (WHEN CURRENT IS CONTROLLED)

GALVANOMETER-TYPE SCANNER

BACKGROUND OF THE INVENTION

1. Field of the Invention

The present invention relates to a galvanometer-type scanner that is used to move mirrors during laser marking or the like. In more detail, the present invention relates to a galvanometer-type scanner with improved acceleration without increases in size or cost.

2. Related Art

A galvanometer-type scanner is used to move mirrors during laser marking or the like. Such devices need to perform positioning operations for minute angles, such as one degree, within a positioning time in the order of several hundred microseconds.

The acceleration of a galvanometer-type scanner is improved by increasing the torque to inertia ratio. When the inertia is fixed, it is important how soon the torque rises. As can be understood from the graph in FIG. 4 showing the exciting current waveform of a direct current motor at startup, when the motor current is controlled by current feedback, normally the rise in torque can be brought forward and the responsiveness can be improved by increasing the ratio ($K_E/L$) of the induced voltage constant $K_E$ to the armature inductance L. In this graph, E is the power supply voltage and R is the armature resistance.

This is to say, as shown by the graph in FIG. 4, at startup during a period that is considerably shorter than the electrical time constant L/R, the current i can be approximated to (E/L)t (which is to say, i≈(E/L)t), and if the torque constant for the torque T is set at $K_T$, the torque constant and induced voltage constant $K_E$ are equal in a DC motor, so that the torque T can be expressed as $$T = K_T i = (K_T/L)Et = (K_E/L)Et$$

In this equation, Et is limited by the capacity of the power supply, so that $K_E/L$ is the index for the rise of torque.

Conventionally, the number of poles of a limited rotation-type DC motor that is used in a galvanometer-type scanner is two. In this case, the number of turns N in the armature winding of the DC motor is reduced in order to bring forward the rise of torque and improve the acceleration characteristics. This is because the induced voltage constant $K_E$ is proportionate to the number of turns N ($K_E \propto N$), and the armature impedance L is proportionate to the square of the number of turns N ($L \propto N^2$), so that $K_E/L$ is inversely proportionate to the number of turns.

However, if the number of turns is reduced, the torque constant $K_T$ that is equal to the induced voltage constant $K_E$ falls, so that the induced current in the winding increases. As a result, the capacity of the power converting element and power supply circuit increases, and since there is also an increase in power loss, this is disadvantageous from the viewpoints of size and cost.

SUMMARY OF THE INVENTION

The present invention was conceived in view of the problem described above and it is an object of the present invention to provide a galvanometer-type scanner with improved responsiveness without causing increases in size and cost.

In order to achieve the stated object, the present invention is a galvanometer-type scanner that is required to perform positioning operations for minute angles of around one degree within a positioning time in the order of several hundred microseconds, which is to say, in uses where the acceleration is 100,000 rad/s$^2$ or higher. In cases where an oscillation angle of the motor specification is no greater than 30 degrees and the electrical time constant (L/R) of the DC motor is longer than the required positioning time, the number of poles in the DC motor is four.

With the galvanometer-type scanner of the present invention, the armature inductance L can be set at one half or less for the same induced voltage constant compared to the case of a bipolar DC motor where the external diameter of the rotor is the same. As a result, $K_E/L$ that is the index for the rising of the torque can be increased by a factor of two or more, so that the responsiveness of the DC motor can be improved.

It should be noted that by setting the number of poles of the DC motor at four, the effective oscillation angle is reduced, but since oscillation angles of 10 to 30 degrees are normally used when moving a mirror, this reduction in the effective oscillation angle is not problematic.

DESCRIPTION OF THE PREFERRED EMBODIMENT

The following describes, with reference to the attached drawings, an example of a galvanometer-type scanner to which the present invention has been applied.

Figure 1:
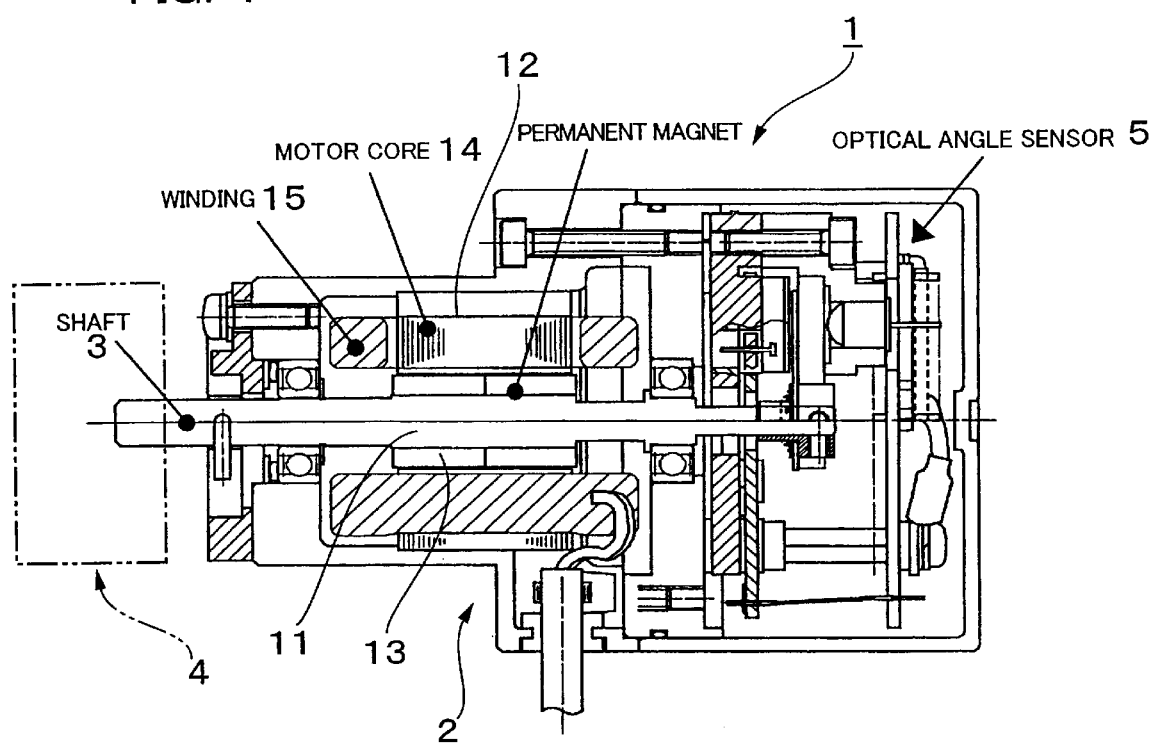
FIG. 1 is a vertical cross-sectional view showing one example of a galvanometer-type scanner to which the present invention has been applied.
Figure 2:
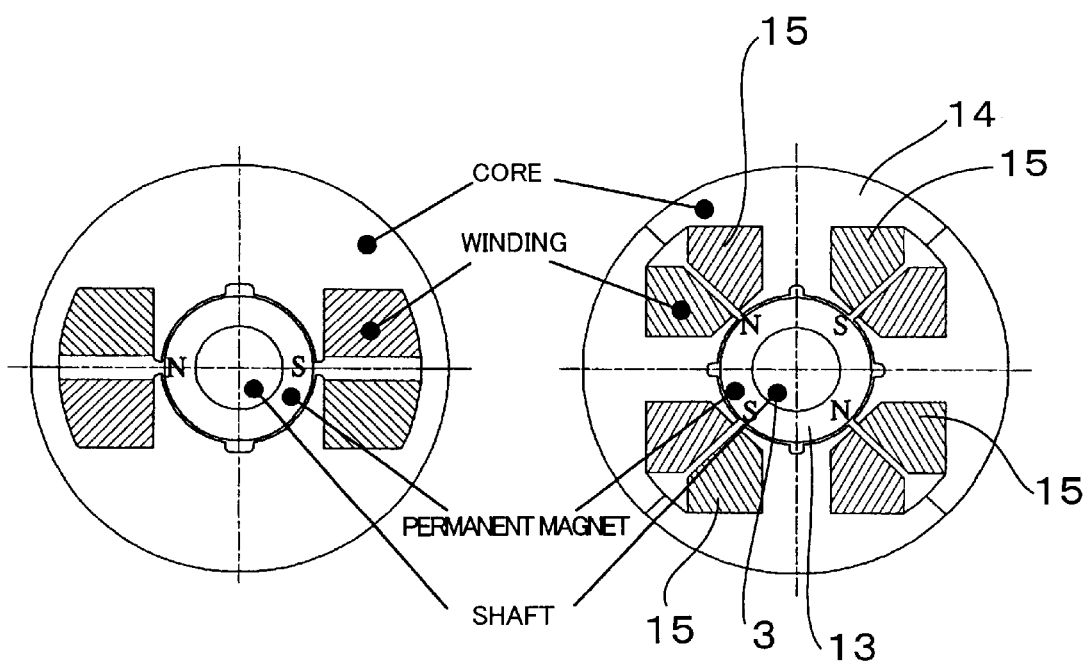
FIG. 2 is an explanatory view in which the cross-sectional construction of a DC motor that forms part of the galvanometer-type scanner of FIG. 1 is compared with a bipolar DC motor.
Figure 3:
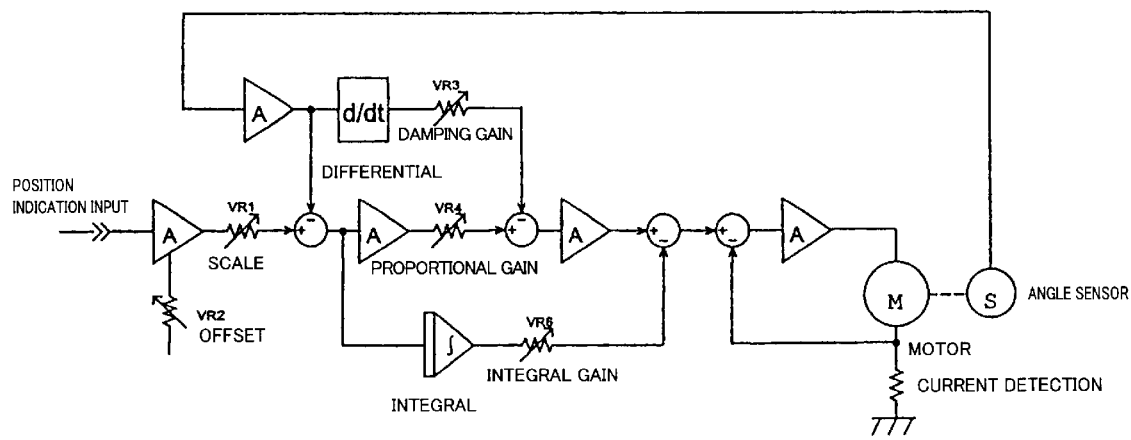
FIG. 3 is a simplified block diagram showing the control circuit of the galvanometer-type scanner shown in FIG. 1.
Figure 4:
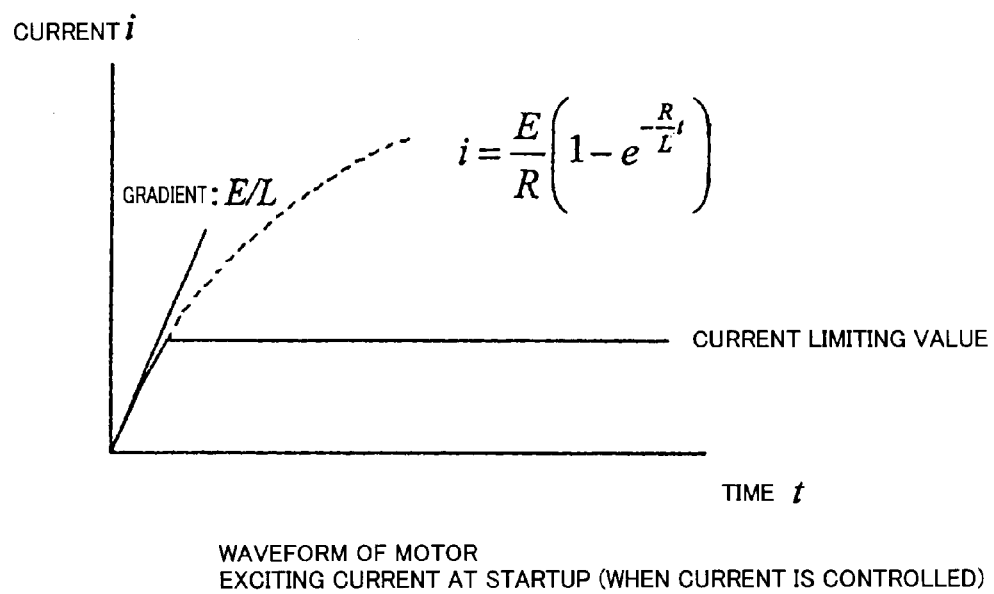
FIG. 4 is a graph showing the waveform of the motor induced current at startup of a motor in a galvanometer-type scanner.

FIG. 1 is a vertical cross-sectional view showing a galvanometer-type scanner according to the present embodiment, FIG. 2 is an explanatory view in which the cross-sectional construction of this galvanometer-type scanner is compared with a bipolar DC motor, and FIG. 3 is a simplified block diagram showing the control circuit of this galvanometer-type scanner.

As shown in these drawings, the galvanometer-type scanner 1 comprises a limited rotation-type DC motor 2, a mirror 4 that is attached to a rotational shaft 3 of the DC motor 2, and an optical angle sensor 5 that detects the rotational position of the DC motor 2.

The DC motor 2 comprises a rotor 11 and an armature 12, which is concentric with the rotor 11 and surrounds the circumference of the rotor 11. A four-pole ring permanent magnet 13, in which north and south poles are alternately formed around the outer circumferential surface at 90 degree intervals, is attached to the rotor 11. The armature 12 comprises a core 14 and a winding 15, which is wound around the core 14, with these forming four magnetic poles that are arranged at 90 degree intervals. In the present embodiment, the core 14 comprises four 90-degree arc-shaped core parts, with the winding 15 being wound around projecting pole parts formed in each of the core parts.

The galvanometer-type scanner 1 of the present embodiment is used for applications where the positioning operations for minute angles, such as one degree, need to be completed within several hundred microseconds, which is to say, applications where an acceleration of at least 100,000 rad/s$^2$ is required. In addition, in these applications the oscillation angle of the mirror 4 is 30 degrees or below. The electrical time constant (L/R) of the DC motor 2 is set so as to be longer than the positioning time that is required.

In the galvanometer-type scanner 1 of the present embodiment, the DC motor 2 has four poles, so that in a case where the rotor has the same external diameter as that used in a bipolar DC motor and the induced voltage constant is the same as in a bipolar DC motor, the armature inductance L can be reduced to half or less. As a result, $K_E/L$, which is the index for the rise of torque, is increased by a factor of two or higher, so that the responsiveness of the DC motor can be improved without increasing the exciting current in the winding.

In the case of a bipolar DC motor, two core parts that extend over 180-degree arcs are used, though in the four-pole DC motor in the present embodiment, four core parts that extend over 90-degree arcs are used. When four core parts are used, the winding operation is easier and is advantageous in that it reduces manufacturing costs.

Compared to the case where two poles are used, using four poles can reduce the amount of magnetic flux per tooth by half. Accordingly, the yoke width that is the magnetic path for the outer circumference of the core can be made small, so that it is possible to produce a DC motor with a small diameter.

It should be noted that Table 1 is a comparison chart in which the characteristics of the four-pole DC motor 2 of the present embodiment are compared with those of a bipolar DC motor. In this chart, $\omega$ represents the speed of the rotor and $R_m$ represents the magnetic resistance of the armature magnetic circuit, with these being equal for bipolar and four-pole constructions when design based on similar figures is performed.

In a bipolar DC motor and a four-pole DC motor, design based on similar figures cannot be performed when the thicknesses of the permanent magnets are equal, with the thickness of the permanent magnet being larger in a four-pole DC motor. In this case, the value $K_E/L$ becomes more than double for the four-pole DC motor. When the galvanometer-type scanner 1 of the present embodiment is used, the value of $K_E/L$ can be set at above 50 (V/rad/s/H) for a case where the power supply voltage is 24V and the power supply current is 20A.

TABLE 1

|  | Bipolar | Four-pole |
| --- | --- | --- |
| Flux per pole | $\Phi$ | $\Phi/2$ |
| Number of turns per pole | N | N/2 |
| Induced voltage per pole | $N \Phi \omega$ | $N \Phi \omega/2$ |
| Inductance per pole | $N^2/R_m$ | $(N/2)^2/R_m$ |
| Induced voltage constant $K_E$ for a serial connection | $2N \Phi$ | $2N \Phi$ |
| Inductance L for a serial connection | $2N^2/R_m$ | $N^2/R_m$ |
| $K_E/L$ | $\Phi R_m/N$ | $2 \Phi R_m/N$ | where
$\omega$: Speed of rotor
$R_m$: Magnetic resistance of the armature magnetic circuit As described above, in the galvanometer-type scanner of the present invention, the number of poles of the DC motor that is incorporated in the galvanometer-type scanner is set at four. By doing so, electrical inductance for the same induced voltage constant can be reduced to half or less compared to the case of a bipolar DC motor that has a rotor of the same size.

According to the present invention, $K_E/L$, which is the index for the rising of torque, can be increased by a factor of two or more without doubling the number of turns in the winding. This means that the responsiveness of the motor can be improved without increasing the exciting current of the winding, so that a galvanometer-type scanner that can perform positioning operations with favorable responsiveness can be provided without increases in size and cost.

What is claimed is:

1. A galvanometer-type scanner that is required to perform positioning operations for minute angles of around one degree within a positioning time in the order of several hundred microseconds, an oscillation angle of a mirror being no greater than 30 degrees and the galvanometer-type scanner comprising:

a limited angle direct current (DC) motor; and a mirror that is attached to a rotational shaft of the DC motor, wherein the number of poles in the DC motor is four, and an electrical time constant (L/R) of the DC motor is longer than the required positioning time.

* * * * *